P. R. BASSETT AND E. A. SPERRY.
MEANS FOR TRACING AND LOCATING SUBMARINE BOATS.
APPLICATION FILED JUNE 9, 1917.
1,333,238.
Patented Mar. 9, 1920.
2 SHEETS—SHEET 1.
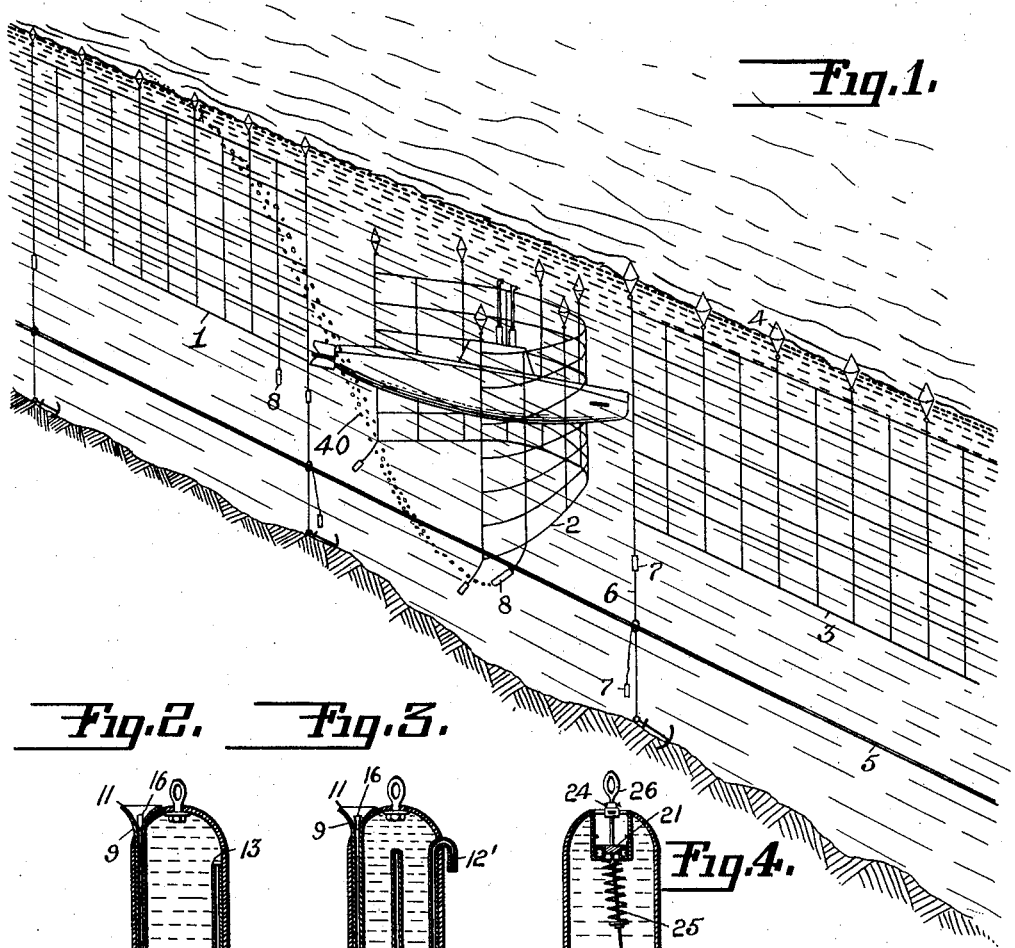
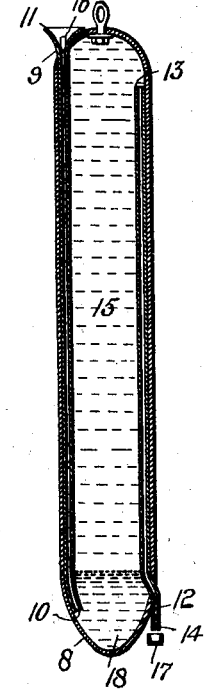
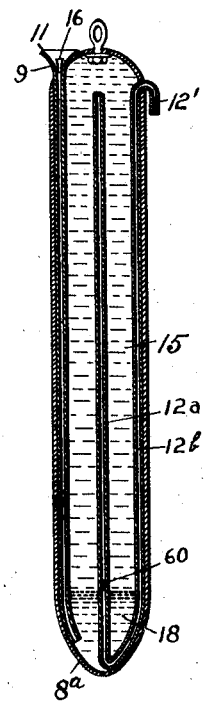
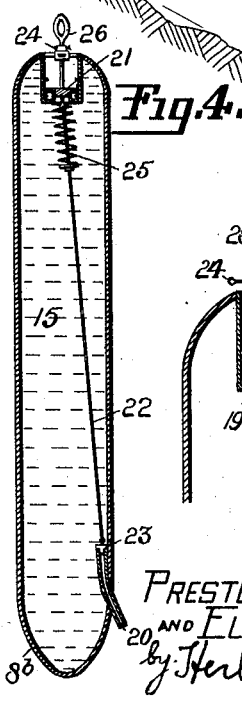
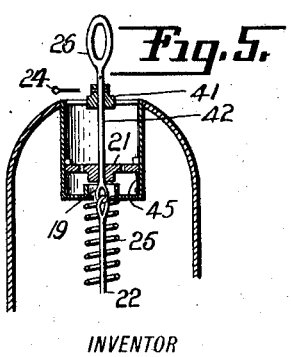
INVENTOR
PRESTON R. BASSETT.
AND ELMER A. SPERRY
by Herbert H. Thompson
ATTORNEY

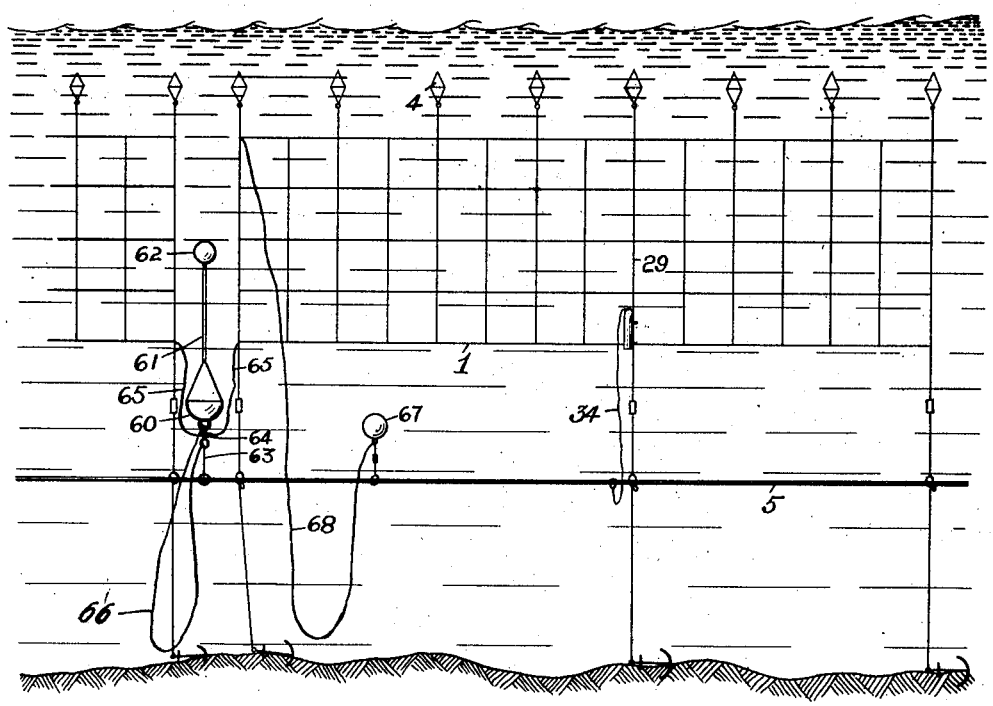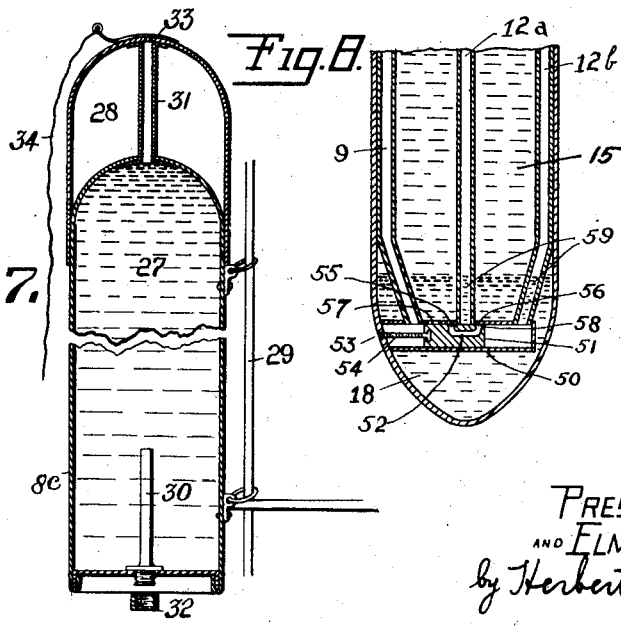

UNITED STATES PATENT OFFICE.

PRESTON R. BASSETT AND ELMER A. SPERRY, OF BROOKLYN, NEW YORK.

MEANS FOR TRACING AND LOCATING SUBMARINE BOATS.

1,333,238.        Specification of Letters Patent.        Patented Mar. 9, 1920.

Application filed June 9, 1917. Serial No. 173,688.

*To all whom it may concern:*

Be it known that we, PRESTON R. BASSETT and ELMER A. SPERRY, citizens of the United States of America, residing at 1716 Newkirk avenue and 1505 Albemarle road, Brooklyn, respectively, in the county of Kings and State of New York, have invented certain new and useful Improvements in Means for Tracing and Locating Submarine Boats, of which the following is a specification.

This invention relates to means for detecting and locating submarine boats and involves the use of nets in which the submarine boats may become enmeshed, and a tell tale whereby the submarine boat may be traced after it has engaged the net.

There are at present various methods by which the engagement of a submarine boat with a net automatically sets in operation a signal by which the presence of the boat is announced. When the patrol boats arrive at the place indicated by the signal, the submarine has, of course, gone, taking with it the net and some means such as a float by which the submarine may be followed after the float has been located. But there is difficulty in locating the float as there is no way of knowing what direction the submarine has taken.

The object of our invention is to provide means by which the path of the submarine will be marked upon the surface of the water, so that patrol boats arriving at the place where the submarine encountered the net, may at once detect the course taken by the submarine even though it may then be many miles away, and follow it up until it is overtaken.

One of the decided advantages offered by our invention, is that it may be used in connection with nets having no apparatus such as we have referred to above, for signaling the presence of the submarine boat in some particular place. The submarine may encounter the net during the day or night, and continue on its journey, "unconsciously" leaving the tell-tale of its course.

Hours later,—in the morning, for instance, if the submarine engaged the net during the night,—a patrol boat or an aeroplane discovering the trail may trace and soon locate the hidden submarine.

Referring to the drawings wherein we have shown what we now consider to be the preferred forms of our invention:

Figure 1 is a view showing the manner in which our invention operates.

Fig. 2 is an elevation in section of a cell designed to be attached to a submerged net.

Fig. 3 is a modified form of cell.

Figs. 4 and 5 show another modification thereof.

Fig. 6 shows the net and floats moored completely below the surface.

Fig. 7 is another modification of the cell, and Fig. 8 is a modification of the tubes in Fig. 3.

In Fig. 1 we have shown a submarine barrier comprising a plurality of nets 1, 2 and 3, which may be placed in the sea in the usual manner, suspended by floats 4 and attached to an anchor cable 5. The connecting members 6 between the nets and anchoring cable are provided with shearing pins 7, which, when the net held thereby is dragged through the water by a submarine boat, separate, so that only a small section, *i. e.*, one net, of the system is carried away, while the rest remain undisturbed.

A container 8 is shown secured to each net. This container may be filled with oil, such as crude petroleum, or with any other suitable substance that will rise to the surface when liberated, and float about or form a film upon the water, the container being designed to liberate the substance when the net is dragged through the water. When an oily substance is used, an irridescent film marks the trail of the enmeshed submarine, and a patrol boat or an aeroplane coming upon the trail, or seeing it from a distance may soon run down its prey. If the submarine becomes enmeshed during the night, it will mark its trail which may be picked up in the morning. On the other hand, by using a phosphorescent or other glow producing material a glow which will last for several hours will be produced over the water, thus creating a trail which may be visible at night. One form of this material may be obtained by drying and pulverizing certain portions of any phosphorescent or light producing fish, such as lantern fish, and suspending the powder in a liquid. By using both of these classes of substances, the trail will be visible both by day and by night. The two substances may be mixed and placed in the same cell, or, if desirable, separate cells may be provided for each substance, or separate compartments may be provided in a single container. If the two substances are placed in the same compartment, the powder may be suspended in the oil itself, so that the one mixture may produce an iridescent trail by day and a luminous trail by night.

In Fig. 2 we have shown a cell 8 provided with a tube 9 having an opening 10 near the bottom of the inside of the cell, and another opening 11 near the top of the outside of the cell. Another tube 12 may be provided having an opening 13 near the top of the inside of the cell, and an opening 14 near the bottom of the outside of the cell. The cell may be filled or nearly filled with the trail making substance 15, and any suitable stoppers such as a cork 16 and cap 17 provided to prevent the substance from leaking out before the cell is placed in the water.

When the cell is attached to the net and placed in the sea as shown in Fig. 1, the stoppers may be removed. Water will then fill tube 9 and the bottom of the cell as shown at 18. When the net and cell are dragged through the water by a submarine boat as shown in Fig. 1, the cell tends to assume a horizontal position and the pressure of the water in the opening 11, due to the dragging of the opening against the water, becomes sufficient to force the oil or other substance out through tube 14, whereupon, being lighter than water, it rises as shown at 40, to the surface of the water, spreads out and forms an iridescent film, or a glow as previously pointed out. When the submarine stops and the cell again assumes an upright position and the water pressure through opening 11 again becomes normal, the substance 15 will cease to issue. We prefer, however, that the substance, having once begun to issue, shall continue to do so until the supply within the container is exhausted. Thus, when the submarine discovering the net, stops going, the end of the trail may not be carried away by currents, and the location of the boat lost. The constant flow of the marking substance will keep the end of the trail directly above the submarine.

In Fig. 3 we show the tubes so arranged as to accomplish this end. This is done by using, instead of tube 12 as in Fig. 2, an inverted siphon 12'. The arm 12$^a$ of the siphon may be plugged at some point as for instance at 60 to prevent the marking fluid from rising in arm 12$^b$. The plug may consist of a substance soluble in water, but not soluble in the oil or other marking fluid. Numerous salts or hardened sugar syrup may be used. When the cell is placed in the sea the water will enter the tube and dissolve the plug. The dragging of the cell causes a pressure through opening 11 as before. This pressure is sufficient to force the substance 15 out through tube 12'. When the submarine stops moving and the cell assumes an upright position, the tube 11 is filled with water and tube 12' with the lighter substance 15. The greater pressure now on the one side is sufficient to force the substance out on the other. Thus, when the said substance once starts to issue, it will not stop until the supply becomes exhausted.

In Fig. 8 we show a modification of the tubes shown in Fig. 3. Here the bottom of tube 9 and the arms 12$^a$ and 12$^b$ of the inverted siphon 12' all connect with a valve 50. The piston 51 is provided with a passageway 52. The valve is shown closed. The cell is originally filled with the trail making substance 15 and a little water 18. The valve prevents the contents of the cell from flowing out. As the cell in the upright position is being lowered into the sea, the valve is operated by inserting a screw driver at 53 and turning the threaded rod 54. This moves opening 55 in the piston opposite opening 57 in the valve casing, and opening 56 opposite tube 12$^a$. The shoulder 58 of the piston is made narrow so that the opening into tube 12$^a$ may straddle it while the opening 55 is still passing across opening 57. This will permit some of the water 18 to enter tubes 12$^a$ and 12$^b$ as shown at 59, thus preventing the substance 15 from rising in tube 12$^b$. The moving of the piston continues until opening 55 is opposite tube 9 and opening 56 is opposite opening 57.

The inlet through tube 9 to the bottom of the cell is now established as well as the outlet through tubes 12$^a$ and 12$^b$.

Instead of providing the cell with the tubes, any other suitable means which will accomplish the desired result may be employed. In Figs. 4 and 5, we have shown one form of mechanical valve. In this form an opening 19 is shown near the top of the cell and another opening 20 near the bottom. A stopper 21 serves to normally close the upper opening as shown in Fig. 4. A rod 22 extending from stopper 21 to a stopper 23 for the lower opening, holds stopper 23 in place as long as stopper 21 is in the closed position. A pin 24 passing through a fixed part 41 and rod 42 in stopper 21 may be provided to lock the stoppers against accidental opening before the cell is placed. This pin is of course removed when the cell is placed in the water. A spring 25 is provided, having sufficient strength normally to keep the cell closed when it is suspended by rod 26 from the net. The sudden tugging by the submarine overcomes the spring and lifts both stoppers out of place, and a small catch 45 prevents them from closing again. The pressure of the water through opening 19 forces the trail making substance out through 20 when the cell is dragged, while, when the submarine stops moving, the water will enter through 20, and the substance will issue through 19.

Fig. 7 illustrates another type of cell 8ᶜ which may be used in connection with our invention. Two compartments 27 and 28 are shown. The trail making substance may be placed in 27, while 28 may be filled with air. The cell may be attached to the net by being fastened to one of the strands 29, (see Fig. 6). The air chamber keeps the cell upright when moored, and also tends to keep it upright while it is being dragged through the water.

The construction and operation of this cell is as follows:

A small opening through a tube 30 is provided in the bottom of compartment 27. Another tube 31 may be provided leading out from the top of the same chamber. A cap 32 may serve to close the tube 30 until the cell is placed in the water, when it should be removed. Tube 31, however, remains closed when the cell is placed. Any suitable means which will readily open when the cell is dragged may be used to close this tube. We have shown a thin strip of metal 33 which may be soldered with a soft solder over the opening. One corner of this strip has fastened to it a light cable 34 which is in turn secured to the anchor cable 5.

When the cell is placed in the sea, the water presses in through tube 30, but cannot enter as the compartment is filled with the trail making substance, nor can the substance leak out, as the upper tube is closed. When the net is dragged apart from its moorings, however, carrying the cell with it, the strip 33 which is fastened to the anchor cable is torn off. The substance now issues from tube 31, while the water enters through tube 30. This leakage continues until the marking fluid is exhausted, whether the submarine is moving or standing. Numerous other ways may be resorted to for keeping the upper tube closed until the proper time for opening, such for example, as a stopper held in place by a spring, and removed by the tugging, and held open by a catch, somewhat similar to the stopper 21 shown in Fig. 5.

In Fig. 6, we show the net 1 so moored that the floats 4 are held at a depth that will not permit of their being uncovered at low tide. This is so that wherever desirable, the system may be completely concealed from a submarine boat navigating with its periscope above the surface. This, of course, would apply where patrol boats are not sufficient in numbers to keep the submarines down, and especially at night, when it is difficult for the patrols to see the periscope a short distance away.

Referring again to the trail making material, there are numerous substances, in the form of powder or liquid, both animal, such as certain marine organisms, and vegetable, which are capable of producing a glow. Such substances, while not necessarily containing phosphorous, are commonly termed phosphorescent. In using the term phosphorescent, therefore, the broad sense is intended.

In Fig. 6, we show a buoy 60, having a mast 61 with a ball 62 on the top thereof. The function of this apparatus is to indicate to patrol boats or aeroplanes in the distance that a submarine boat has dragged one of the sections of the net from its moorings.

This signaling apparatus is normally held below the surface of the water by a connection 63 to the anchor cable 5. A shearing pin 64 forms a part of the connection 63 and is torn apart when one of the sections of the net is carried away, by a connection 65 from the net to the shearing pin. The buoy then rises to the surface, lifting the ball 62 a substantial height above the water. A cable 66 secured to the anchor cable may now serve to prevent the apparatus from drifting away.

While we have shown the signaling apparatus in its simplest form, having only a ball 62 which may be painted a conspicuous color, it is obvious that any other suitable signaling apparatus may be used. When the patrols arrive, they may pick up the trail and run down the submarine.

We may also provide a tail float 67 connected to the anchor cable 5, and connected to the net by a long cable 68. When the net is carried away, the float is torn from the anchor cable, and rises to the surface. This buoy may serve as an additional means for indicating the precise location of the submarine.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described our invention, what we desire to secure by Letters Patent is:

1. In combination with a net for enmeshing submarine boats, a container attached to said net, a marking substance within said container, and means for causing said substance to issue from said container, when said net is dragged through the water.

2. The method of tracing and locating submarine boats, which consists in attaching a flask containing an oily substance to a submarine net, said flask being adapted to spill said substance when dragged through the sea, whereby a trail is marked upon the water.

3. In combination with a net for enmeshing submarine boats, a container attached thereto; a phosphorescent substance within said container and means for allowing said substance to escape upon said net being engaged by a submarine boat.

4. In combination with a net for enmeshing submarine boats, a flask attached to said net; an oily substance and a phosphorescent substance within said flask, and means for causing said substance to issue from said flask upon said net being engaged by a submarine boat.

5. An apparatus adapted to be attached to a submarine net, comprising a container; substance of less specific gravity than water within said container; means for causing said substance to issue slowly from said container upon said net being engaged by a submarine boat, and to continue to so issue until the supply thereof is substantially exhausted.

6. In combination with a submarine net, a flask; a substance in said flask and means responsive to the engagement of said net by a submarine boat for causing said substance to issue from said flask.

7. In combination with a net for enmeshing submarine boats, a container; oil within said container, and means for causing the pressure of the sea to expel said oil from said container when a submarine boat engages said net.

8. A submarine boat detector comprising a net adapted to be submerged in the sea; a container attached to said net; an oily substance in said container and means for causing said substance to issue from said container when said net is dragged through the sea.

9. Apparaus for indicating the course of a submarine boat, comprising a net adapted to be placed in the sea to enmesh the submarine boat; a vessel containing oil, said vessel being constructed to allow said oil to leak out when being dragged through the water, whereby a film of oil is formed on the surface of the water.

10. Apparatus for indicating the course of a submarine boat, comprising a submerged net adapted to be engaged by the submarine boat; a vessel containing a fluid having a lower specific gravity than water, and means for causing said fluid to be expelled from said container when said net is dragged through the water, said means being adapted to cause said fluid to continue to be expelled from said container after said net ceases to be dragged.

11. Apparatus for marking the course of a submarine boat, comprising a cable adapted to be submerged in the sea; a plurality of nets connected to said cable and adapted to be engaged by a submarine boat; a shearing pin in each of said connections adapted to break when the net normally held thereby is dragged by a submarine boat; a vessel containing a trail making fluid attached to each of said nets, and means for causing said fluid to be expelled from said container when the net attached thereto is dragged through the water.

12. Apparatus for indicating the path and location of submarine boats, comprising a net adapted to be submerged in the sea to enmesh a submarine boat; a container attached to said net; an oily substance in said container; said container being adapted, when dragged through the water, to slowly spill said substance.

13. Apparatus for indicating the path and location of submarine boats, comprising a net adapted to be placed in the sea; buoys attached to said net for sustaining the latter in a vertical position; means for holding said net and said buoys wholly submerged; a vessel containing a trail making substance attached to said net and adapted, upon said net being engaged by a submarine boat, to slowly spill said substance until the supply thereof is substantially exhausted.

14. A container adapted to be attached to a submarine net, said container having an opening near the bottom thereof; means for maintaining said container in an upright position when the same is in water, and means for opening the top of said container when the container is dragged through the water.

15. A means for tracing the course of submarine vessels comprising a snare adapted to be carried along with said vessel, and a trail producing device attached thereto adapted to leave a visible indication on the surface of the water.

16. In a submarine boat detector, the combination with a snare adapted to be carried along with said boat, detachable signaling means brought into operation by engagement of the snare, and a trail producing device attached to said snare for indicating the path of the submarine.

17. In a submarine boat detector, the combination with a net adapted to be carried away by said boat, a signaling device normally held below the surface of the water; means responsive to the carrying away of said net for causing said device to rise to the surface; a flask attached to said net containing a trail producing substance, said flask being adapted to liberate said substance when said net is carried away.

18. In a submarine boat detector, the combination with a net adapted to be carried away by said boat, a signaling device adapted to be actuated by the carrying away of said net; a trail producing device attached to said net for indicating the path of said boat, and additional means attached to said net for indicating the location of said boat.

19. A container adapted to be actuated by a hostile vessel, said container having an opening, means for preventing the contents of said container from passing through said opening when it is placed in the water and means for rendering said first named means ineffective after said container has once been set in motion by a hostile vessel.

In testimony whereof we have affixed our signatures.

PRESTON R. BASSETT.
ELMER A. SPERRY.